A. G. M. MICHELL.
THRUST BEARING ELEMENT.
APPLICATION FILED JUNE 10, 1915.

1,168,094.

Patented Jan. 11, 1916.

Witnesses

Inventor
Anthony G. M. Michell,
by
Attorney.

UNITED STATES PATENT OFFICE.

ANTHONY GEORGE MALDON MICHELL, OF MELBOURNE, VICTORIA, AUSTRALIA.

THRUST-BEARING ELEMENT.

1,168,094.     Specification of Letters Patent.     Patented Jan. 11, 1916.

Original application filed January 3, 1913, Serial No. 740,041. Divided and this application filed June 10, 1915. Serial No. 33,394.

*To all whom it may concern:*

Be it known that I, ANTHONY GEORGE MALDON MICHELL, a subject of the King of Great Britain, residing at No. 450 Collins street, Melbourne, in the State of Victoria, Commonwealth of Australia, have invented an Improved Thrust-Bearing Element, of which the following is a specification.

This invention relates to thrust bearings of the type described in the pending application for patent Serial No. 740,041, filed January 3, 1913, of which this application is a division, said bearings being adapted to horizontal or inclined shafts, and characterized by the use of pivoted bearing elements, which are located on the lower side of the shaft in an oil well constructed preferably in the lower portion of the fixed case of the bearing. According to the present invention two of such pivoted blocks are used co-acting with the surface of a thrust collar on the shaft, and mounted on a third pivoted element, hereinafter called the housing, in such a manner that the whole forms a connected element adapted to be inserted in the said oil-well, for transmitting the thrust from the collar to the fixed case.

Figure 1:
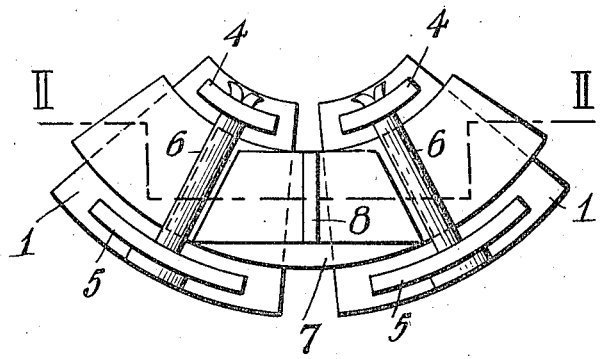
Figure 2:
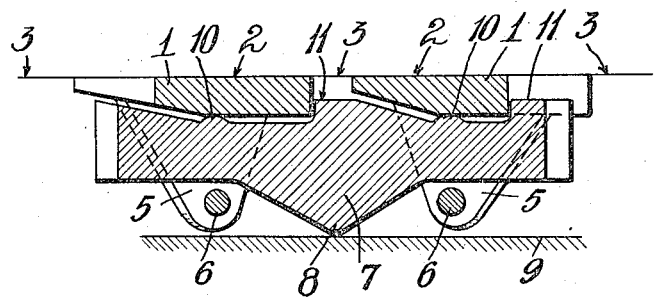

In the accompanying drawing Figure 1 is a view of the combined element, looking toward the working face of the collar. Fig. 2 is a section of the same on the line 11—11 of Fig. 1, showing also the faces of the collar and fixed case.

The blocks 1 are constructed with plane front or working faces 2 making lubricated contact with the working surface 3 of the shaft-collar. On the rear sides, opposite to the working faces 2, they are furnished with lugs 4, 5 in which are inserted pins 6 by which the blocks are secured to the housing.

The housing 7 which may be of segmental shape as shown, is furnished with a projection 8 adapted to support the housing pivotally on the surface 9 of the case of the bearing. On its opposite or front surface it also carries projections 10, upon which the blocks 1 are pivotally supported. It is obvious that such projections or pivots may be on the blocks, the contacting surfaces of the housing being flat. The front surface of the housing is also furnished with projections 11, which serve in conjunction with the pins 6 to lock the blocks to the housing so that the whole forms a connected element, which may be inserted into and removed from, the oil-well as one piece. The pins 6, however, are not in contact with the housing, so that the locking of the blocks is not rigid and they are able to tilt slightly on the projections 10. The projection 8 is located midway between the projections 10, so that the housing 7, being fulcrumed at 8 equalizes the thrust pressure carried on each of the blocks 1. All the projections are made as short, and in all dimensions as small, as may suffice to carry their loads, in order that there may be a pivoting action in a radial, as well as a tangential, direction.

I claim:—

1. A thrust-bearing element comprising a pivoted housing and a pair of blocks pivotally mounted upon and secured to said housing, substantially as described.

2. In a thrust-bearing element, comprising two pivoted blocks, means for distributing the thrust pressure equally between said blocks, and for attaching said blocks together, substantially as described.

3. In a thrust-bearing, a pair of bearing blocks as 1, 1, and an element as 7 provided with means for attaching and pivotally supporting said bearing blocks, and for equalizing the pressure between them.

In witness whereof I have signed this specification.

ANTHONY GEORGE MALDON MICHELL.